(No Model.) 2 Sheets—Sheet 1.
C. A. WEED.
PLATFORM SPRING FOR WAGONS.

No. 541,704. Patented June 25, 1895.

WITNESSES:
F. L. Ourand.
Jo. L. Coombs

INVENTOR:
Clinton A. Weed,
by Louis Bagger & Co.
Attorneys.

(No Model.)
2 Sheets—Sheet 2.
C. A. WEED.
PLATFORM SPRING FOR WAGONS.
No. 541,704.
Patented June 25, 1895.
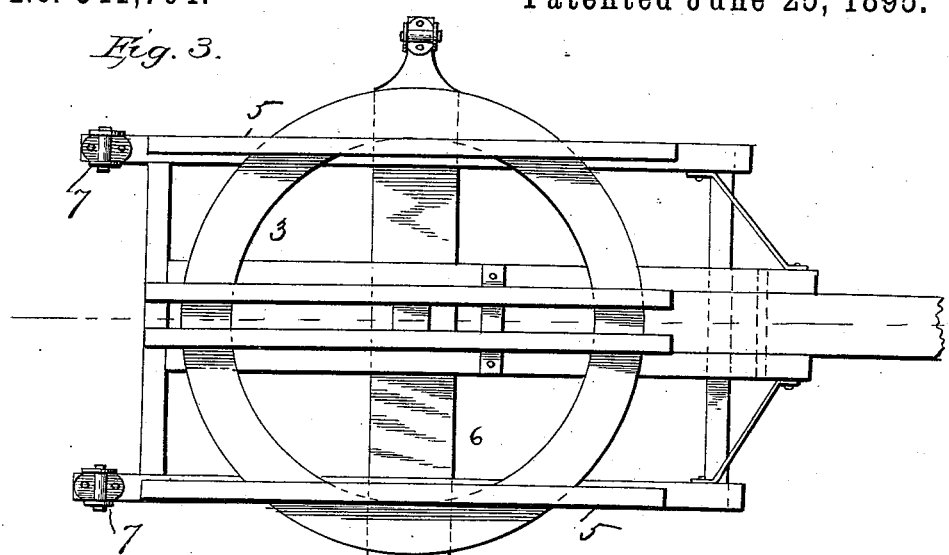
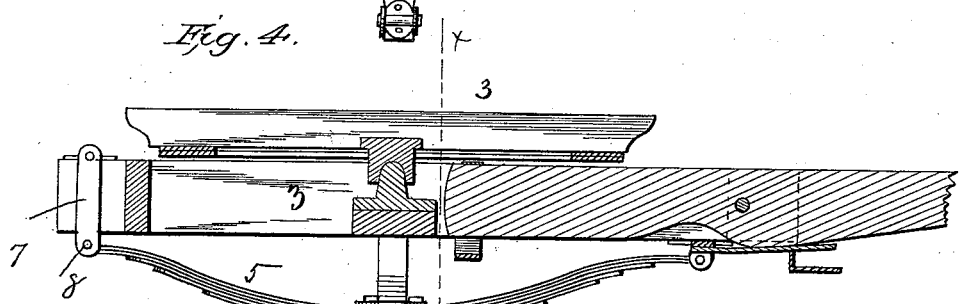
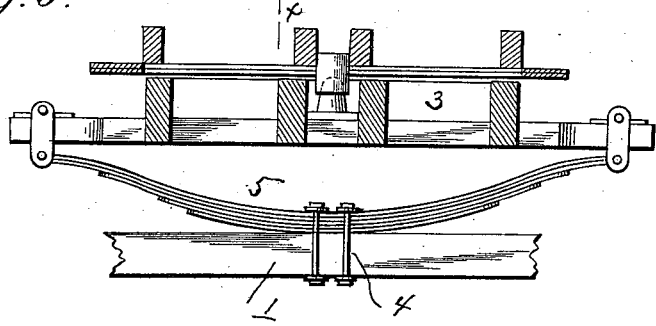
WITNESSES:
INVENTOR:
Clinton A. Weed,
James Bagger &Co.
Attorneys.

UNITED STATES PATENT OFFICE.

CLINTON A. WEED, OF RACINE, WISCONSIN.

PLATFORM-SPRING FOR WAGONS.

SPECIFICATION forming part of Letters Patent No. 541,704, dated June 25, 1895.

Application filed September 24, 1894. Serial No. 523,913. (No model.)

*To all whom it may concern:*

Be it known that I, CLINTON A. WEED, a citizen of the United States, and a resident of Racine, in the county of Racine and State of Wisconsin, have invented certain new and useful Improvements in Platform-Springs for Wagons; and I do hereby declare that the following is a full, clear, and exact description of the invention, which will enable others skilled in the art to which it appertains to make and use the same, reference being had to the accompanying drawings, which form a part of this specification.

My invention relates to improvements in platform springs for wagons and other vehicles, and its object is to provide an improved construction of the same, whereby I secure important advantages with respect to efficiency in operation.

The invention consists in the novel construction and combination of parts, hereinafter fully described and claimed.

Figure 1:
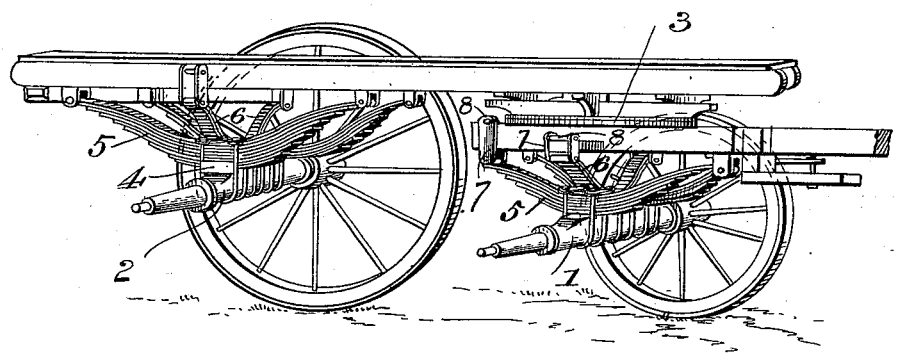
Figure 2:
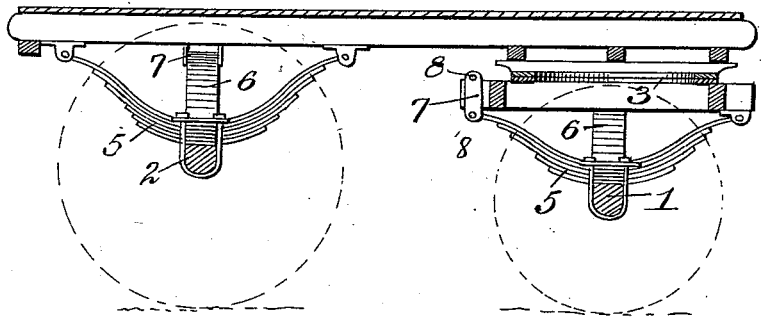

In the accompanying drawings, Figure 1 is a perspective view of so much of the running-gear of a wagon as is necessary to illustrate my invention. Fig. 2 is a longitudinal sectional view of the same. Fig. 3 is a plan view, the wagon-body being removed. Fig. 4 is a central longitudinal section. Fig. 5 is a cross-section on the line $x, x$, Fig. 4.

In the said drawings, the reference numeral 1 designates the front axle, 2 the rear axle, and 3 the turn table with which the wagon pole is connected. The numeral 4 designates a series of clips secured to the axles, and 5 side springs, and 6 cross or transverse springs connected with the axle by said clips. The side springs of the front axle are rigidly connected at their front ends to the said turn table, while their rear ends are connected therewith by means of relief clips consisting of two metal bars 7, embracing the rear ends of the turn table and pivotally connected therewith, and to said springs by pivots 8. The transverse springs are similarly connected with the turn table, while the rear side and transverse springs are in like manner connected with the platform or bed of the wagon.

By the above construction, the relief clips allow the springs to adjust themselves according to the load. The transverse springs serve to center the load. The said springs, and also the side springs, are what are known as leaf springs, and may be of any ordinary or suitable construction.

Having thus described my invention, what I claim is—

In a wagon or other vehicle, the combination with the axle and the turn table, of the side springs rigidly connected at their front ends with the turn table and at their rear ends pivotally connected with relief clips which are pivoted to the rear end of the turn table, the transverse spring, the relief clips pivoted to the ends of said spring and to the sides of the turn table, and the clips for securing said springs to the axle, substantially as described.

In testimony that I claim the foregoing as my own I have hereunto affixed my signature in presence of two witnesses.

CLINTON A. WEED.

Witnesses:
ALFRED McK. WEED,
JACOB ANDERSON.